Figures 11, 12:
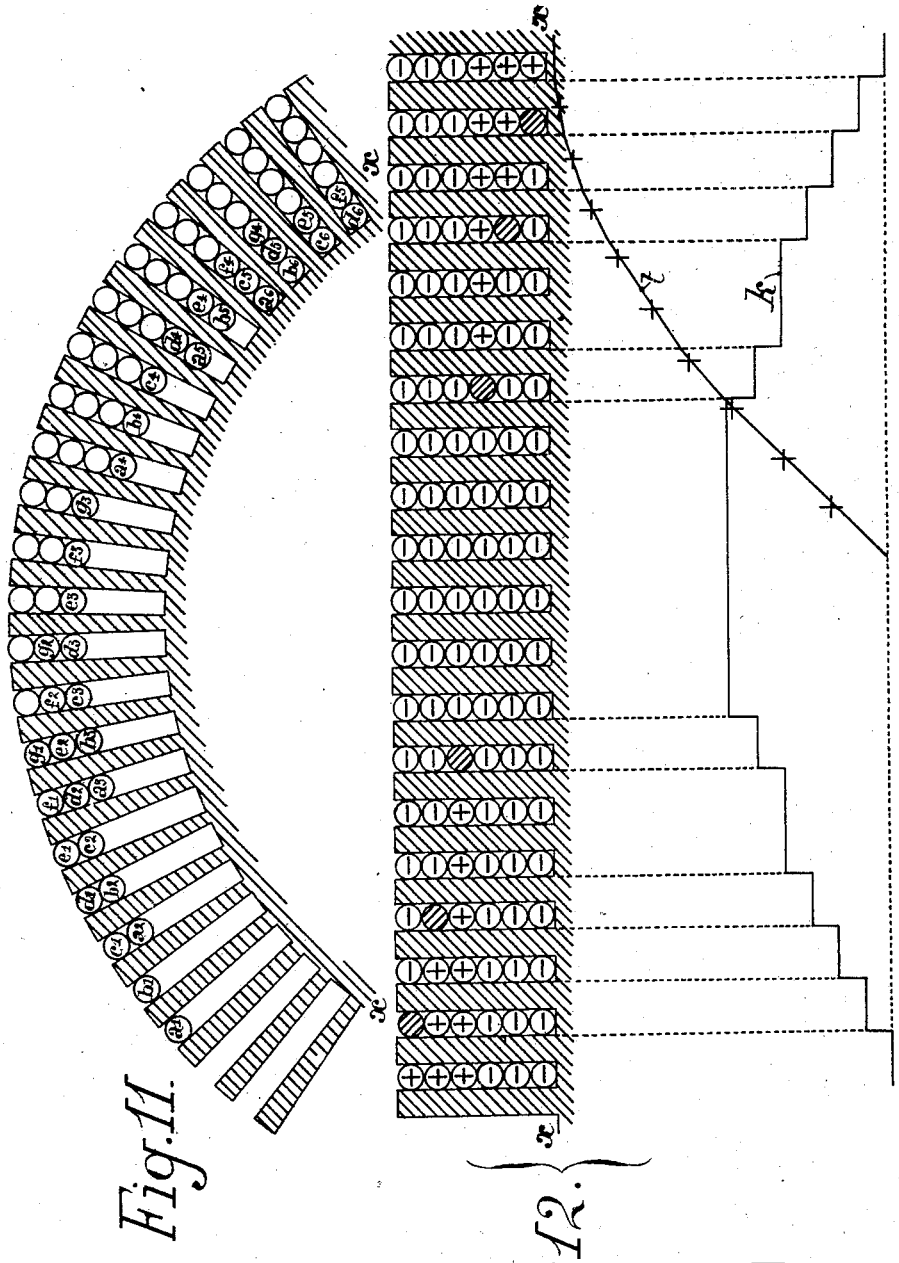

No. 728,766. PATENTED MAY 19, 1903.
R. ROUGÉ.
WINDING FOR ELECTRICAL MACHINES AND APPLIANCES.
APPLICATION FILED OCT. 10, 1902.
NO MODEL. 4 SHEETS—SHEET 1.
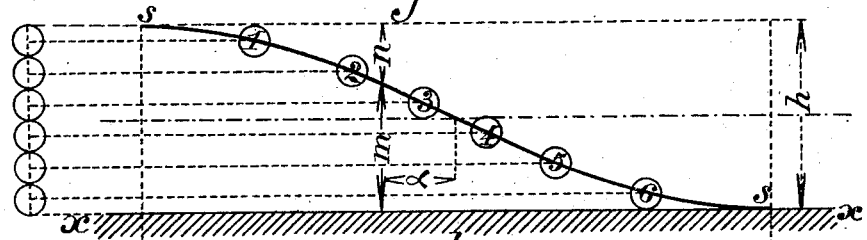
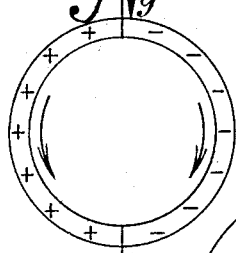
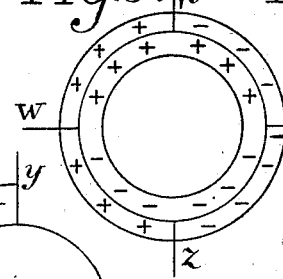
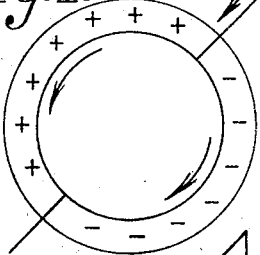
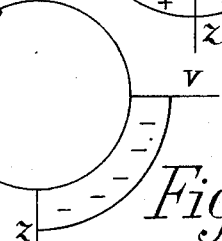
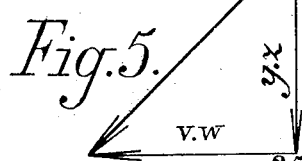
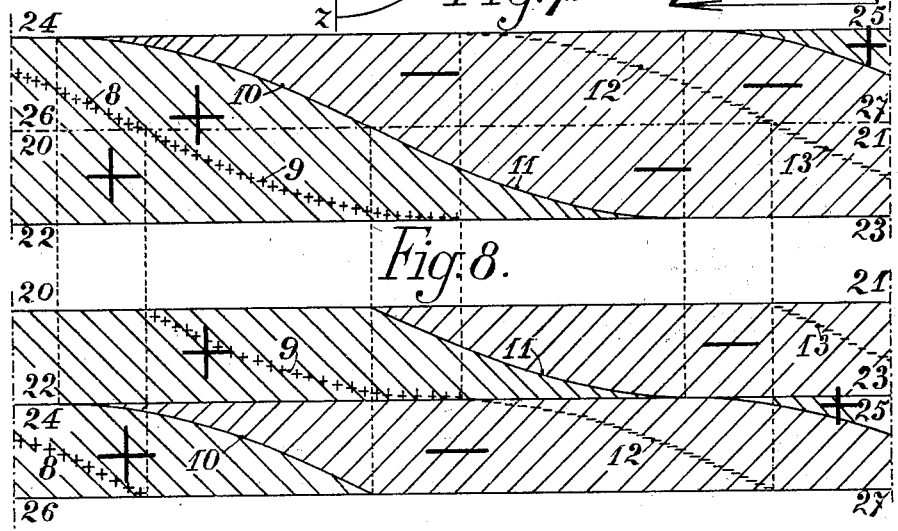

No. 728,766. PATENTED MAY 19, 1903.
R. ROUGÉ.
WINDING FOR ELECTRICAL MACHINES AND APPLIANCES.
APPLICATION FILED OCT. 10, 1902.
NO MODEL. 4 SHEETS—SHEET 2.
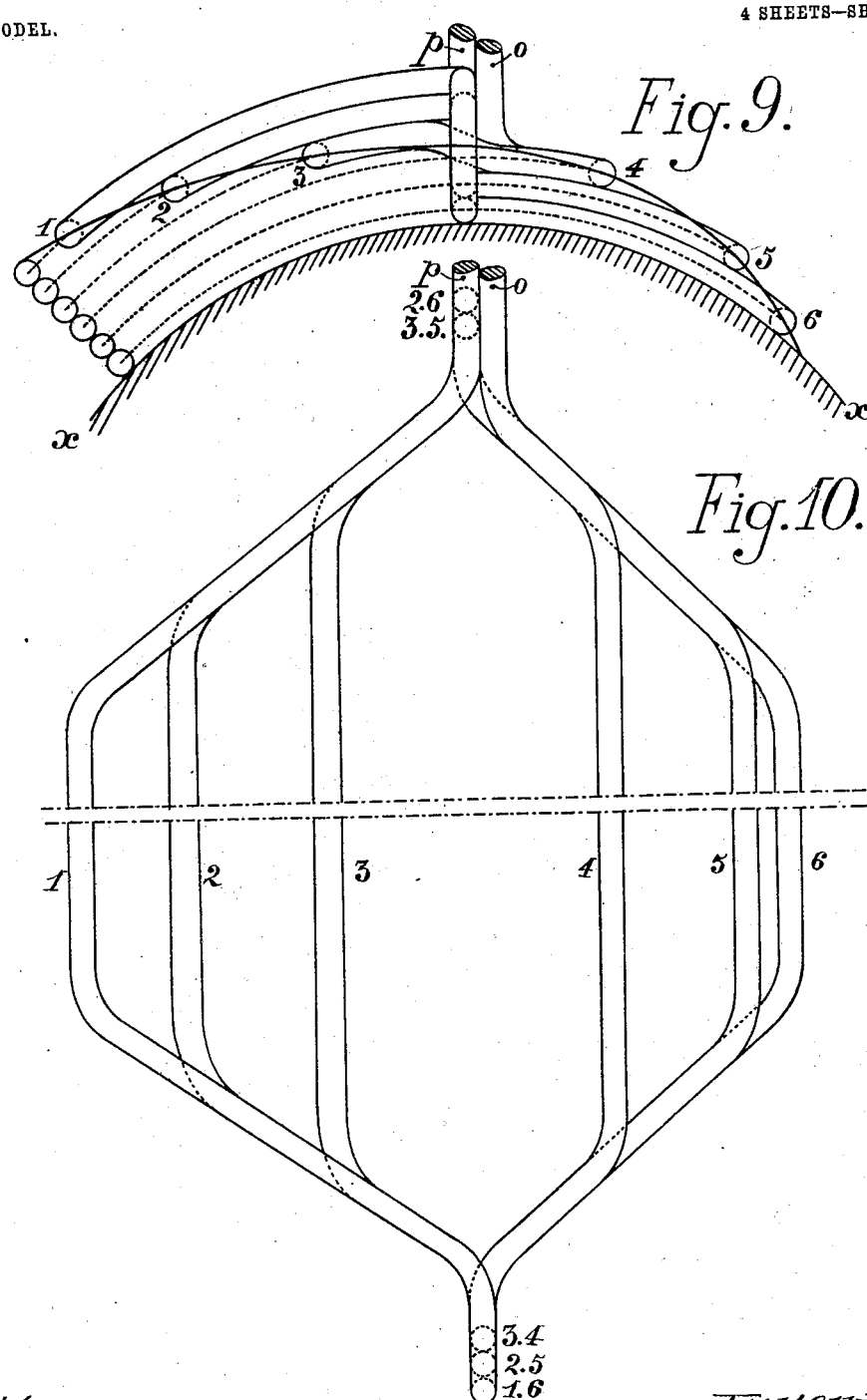
Witnesses:
Inventor
Raymond Rougé
By James L. Norris
Atty.

No. 728,766. PATENTED MAY 19, 1903.
R. ROUGÉ.
WINDING FOR ELECTRICAL MACHINES AND APPLIANCES.
APPLICATION FILED OCT. 10, 1902.
NO MODEL. 4 SHEETS—SHEET 3.

Witnesses:
Inventor
Raymond Rougé
By
Atty.

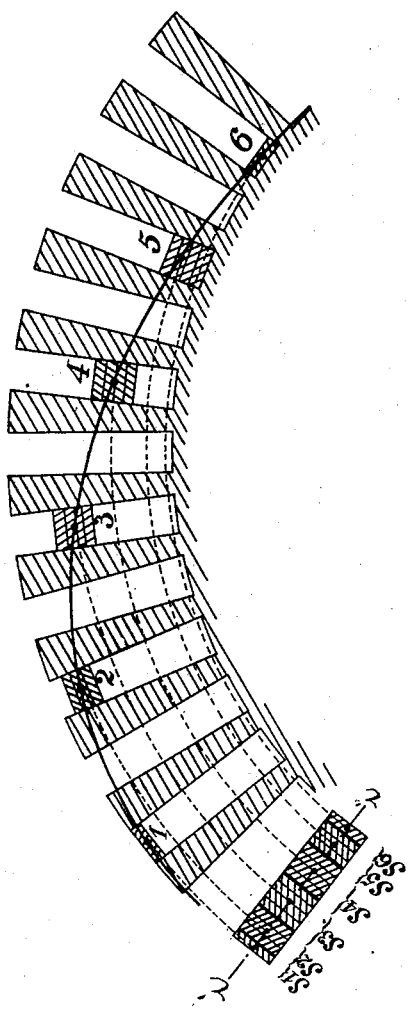

No. 728,766. Patented May 19, 1903.

UNITED STATES PATENT OFFICE.

RAYMOND ROUGÉ, OF PARIS, FRANCE.

WINDING FOR ELECTRICAL MACHINES AND APPLIANCES.

SPECIFICATION forming part of Letters Patent No. 728,766, dated May 19, 1903.

Application filed October 10, 1902. Serial No. 126,748. (No model.)

*To all whom it may concern:*

Be it known that I, RAYMOND ROUGÉ, engineer, a citizen of the Republic of France, residing at 43 Rue du Rocher, Paris, in the Republic of France, have invented certain new and useful Improvements in the Windings of Electrical Machines and Appliances, of which the following is a specification.

This invention relates to improvements in the windings of electrical machines and appliances, and in order that my invention may be readily understood by those skilled in the art to which it appertains I will describe the same fully with reference to the accompanying drawings, in which—

Figure 1 is a diagram explanatory of the novel method of winding. Figs. 2 to 6 are diagrams illustrating the advantages of the novel method of winding. Figs. 7 and 8 are diagrams explanatory of the novel method of winding. Figs. 9 and 10 are respectively an end elevation and a plan view of a bobbin wound in accordance with this invention. Fig. 11 is a diagram showing the arrangement of bobbins similar to that illustrated in Figs. 9 and 10 upon an armature-core. Fig. 12 is a diagram explanatory of the results obtained by the arrangement shown in Fig. 11. Fig. 13 is a diagram representing the arrangement of a bobbin in the teeth of an armature.

The method of winding which forms the subject of this invention is characterized by the following points: The winding is constituted by coils which are all absolutely identical, each being composed of conductors in series distributed in such a manner that if they are assumed to be cut by a plane at right angles to the axis the centers of all the sections of the conductors are situated upon a complete semisinusoid from summit to summit, the length of which is equal to the distance from pole to pole of the winding produced, while the height from summit to summit is equal to the thickness which the winding should have. The arrangement and the number of the conductors of each coil are such that if all these conductors are projected upon a line at right angles to the longitudinal axis of the guide-sinusoid their projections succeed each other without overlapping and without interruption along the entire height of the sinusoid—that is to say, for a height equal to the thickness of the winding. As regards the successive coils, they partly cover each other—that is to say, they are imbricated with a constant displacement such that the superposed coils completely fill the space reserved for the conductors. In other words, the displacement from coil to coil is such that the distribution of the winding is uniform and that along each radius the superposed conductors belonging to different coils are equal in number to the conductors of each coil. This winding may be defined by stating that it is a homogeneous sinusoidal winding.

Referring to Fig. 1, it is assumed that the winding comprises six layers, and consequently that the coils have six conductors. $l$ is the length of the semisinusoid, equal to the distance from pole to pole of the winding. $h$ is the height of the sinusoid from summit to summit, which is equal to the thickness of the winding—that is to say here, to six times the diameter of the wire employed. $x\ x$ represent the developed surface of the core upon which the winding is effected, and $s\ s$ represent the semisinusoid, upon which are distributed the six conductors in series 1 to 6 of the coil.

In practice the line $x\ x$ is an arc of a circle, and consequently the sinusoid $s\ s$ is traced in polar coördinates.

Having thus indicated in a general manner the features which characterize my method of winding, I will briefly enumerate the considerations which have led me to devise it and the advantages which it presents.

It is well known that in closed-circuit collector-windings if a current is caused to enter at a point $y$, Fig. 2, and to leave at a diametrically opposite point $z$ this current separates into two equal parts in the conductors, which are upon the surface of the core. If a section is made at right angles to the axis of rotation, it will be seen that for half of the conductors the current traverses the plane of section from behind forward and for the other half from before rearward. I will term the first "positive" and the second "negative." The distribution of the ampere-turns is uniform, as shown in Fig. 2. If the winding is placed in a magnetic medium, these ampere-turns give rise to a field which, generally speaking, cannot be calculated. Ordinarily the hypothesis is made in approximate theories that this field has a distribution such that its intensity varies according to the radiating direction as the sine of the angle made with the line of the poles by the radius passing through the point of the field considered, or, what comes to the same thing, that this field is assimilable to a uniform field of given direction. If now in the same winding two currents are caused to pass simultaneously, one from $y$ to $z$ and the other from $v$ to $w$, Fig. 3, by extension of the same hypothesis it may be admitted that everything will take place as though these two currents were replaced by a single current, Fig. 4, the value and direction of which would be obtained by geometric composition of the values and directions of the currents $y\ z\ v\ w$. In other terms, it is assumed that everything takes place as if the effects of the currents were assimilable to vectors and were composed as such, Fig. 5; but in reality this is by no means the case, because the examination of Fig. 3 shows that between $y$ and $v$ the effects of the plus and minus currents destroy each other. The same is the case between $z$ and $w$, while, on the other hand, between $w$ and $y$ the effects of the current are cumulative, as they are also between $v$ and $z$. It follows from this that the actual distribution of the ampere-turns is indicated by Fig. 6 and that the hypothesis which conducts to Fig. 4 is false.

With the ordinary windings the effects of the currents are not composed as vectors, and it may be said that these windings are not vectorial.

What has been stated shows that the real distribution of the ampere-turns may in many cases be sufficiently different from the fictitious distribution to render totally illusory theories and practical calculations founded upon the vectorial nature of the effects of the currents. It will therefore be obvious that it is of the highest importance to discover a novel method of winding such that the vectorial property may be obtained for the ampere-turns in all directions, and particularly for any position upon the collector of the brushes which constitute the terminal points of the current. In order that a winding may satisfy this condition, it is obvious that it must be homogeneous—that is to say, that the arithmetical sum of the conductors along each radius must be constant. It is also necessary that along each radius the algebraic sum of the conductors traversed by a positive current and of the conductors traversed by a negative current should be a sinusoidal function of the angle comprised between the radius considered and the terminal radius.

Now, generally speaking, when the brushes which form the terminal points of the current are astride upon two contacts of the collector the coil thus short-circuited forms separation between the positive coils and the negative coils. If this neutral coil is arranged in the winding according to a sinusoidal guide-curve, all the coils which are upon the same side of this sinusoidal guide are positive and all those arranged upon the other side negative. If the winding is homogeneous in accordance with the properties of sinusoids, it is obvious that the above condition is fulfilled—that is to say, that along each radius the algebraic sum of the conductors traversed by a positive current (those which occupy the space $m$, Fig. 1) and of the conductors traversed by a negative current (those in $n$) is, in fact, a sinusoidal function of the angle $\alpha$ comprised between the point considered and the terminal point of the current, (the brush.) It is obvious, in addition, that the sinusoid is the only guide-curve which permits of attaining this result.

To sum up, in order that a simple circuit-winding may be vectorial it is necessary, and only necessary, that it should be sinusoidal and homogeneous. My method of winding, as above described, is therefore vectorial and is the only simple circuit-winding which can be so. The windings thus defined, in addition to their magnetomotive property, also present a corresponding property from the inductive point of view. In fact, if we consider an armature rotating with a uniform movement in a field reduced to an infinitely small element the electromotive force between two opposite points of the armature is proportional to the number of conductors counted with their signs (or direction) which are at the given moment in the field element. If, therefore, the winding is homogeneously sinusoidal, this electromotive force is a sinusoidal function of the angle which defines the position of the armature, and consequently a sinusoidal function of the time. The consequence of this elementary property is that whatever may be the figure of the field in which the armature is placed, provided that this field is invariable, the total electromotive force will be sinusoidal, since it will be the sum of the sinusoidal elementary electromotive forces.

Above we have considered a closed-circuit winding connected to a collector; but if there is no collector the winding may be divided into equal parts, and these parts may be mounted in open circuit, (star-mounting.) This arrangement is important for alternators and alternating-current motors. The winding retains all its properties; but instead of being applicable to any terminal point they are only applicable to the free extremities of the circuits thus constituted. The more important properties of these windings will now be indicated.

(a) Properties common to the two types of winding (closed circuit and open circuit) specially adapted for machines working solely with polyphase current: First, polyphase sinusoidal currents conducted to suitably-separated points of a vectorial winding give rise to a field of definite and constant figure rotating with an absolutely uniform movement; second, under the influence of the rotating field thus produced or of any other rotating field the figure of which is constant and the movement of rotation uniform these windings generate a sinusoidal electromotive force; third, it follows as a corrollary that these windings, submitted either to their own field only or to their own field plus a field of constant figure, absorb with a sinusoidal electromotive force a current which is also sinusoidal.

(b) Properties special to closed-circuit collector-windings applicable to machines utilizing simultaneously alternating currents of different number of phases of different frequencies, and particularly continuous currents: First, all polyphase currents of the same period or frequency, whatever may be the number of phases, have absolutely identical effects when they are conducted into a single winding and when they are conducted into distinct homogeneous superposed windings; second, polyphase currents of different frequencies have absolutely identical effects if they are conducted by brushes sliding in such a manner that the frequency resulting from their own frequency and from the sliding may be the same for all; third, in particular, continuous current conducted upon a collector by brushes sliding at the frequency of synchronism will produce an effect absolutely identical to that of polyphase currents of the same frequency.

Having thus defined the principle of my windings and indicated their principal properties, I will now consider some possible variations in the application of the principle for the purpose of facilitating construction.

It is obvious in each coil all the conductors, such as 1 2 3, Fig. 1, may be replaced by as many groups or bundles of conductors in series. The conditions to be observed are that all the centers of the various groups of conductors shall be situated upon the guide-sinusoid and that the different superposed groups fill in a complete manner the total thickness of the winding. These conditions may be fulfilled in two different manners: first, by coils composed of groups of conductors all equal in total section, thus immediately determining the centers of each group in the same manner as in Fig. 1; second, by coils composed of groups of conductors in series of unequal total sections calculated in such a manner that the centers of the various groups are situated upon the sinusoid in a manner determined, for example, by considerations of the arrangement of teeth.

Assuming, for example, that the teeth, Fig. 13, are given and that it it is desired that the six groups of conductors composing the bobbin shall be placed, respectively, in the notches taken alternately, the positions of the centers (black dots) of the groups 1, 2, 3, 4, 5, and 6 are then well determined; but in order that these positions may be adopted it is necessary that the projections of the sections of the conductors upon the line $i\ i$, perpendicular to the axis of the sinusoid, should be superposed without interruptions or overlapping. In this manner the sections $s'\ s^2\ s^3\ s^4\ s^5\ s^6$ of the six groups of conductors 1 2 3 4 5 6 are determined. As these sections are obtained by the winding of a conductor of uniform section, it is necessary that there should be a simple ratio between them. In the example selected, the section $s'$ being taken as unity, the sections $s^2\ s^3\ s^4\ s^5\ s^6$ are respectively equal to three times, four times, four times, three times, and once the section $s'$. If, therefore, the section $s'$ is formed by a single passage of the conductor, the following sections will be formed by causing this same conductor to pass three times, four times, four times, three times, and once through the corresponding notches. On the other hand, as the order of superposition of the conductors along the same radius is indifferent the sinusoids may be subdivided, and their different parts may be joined in any desired order of superposition. Thus, for example, while for an annular winding the two parts 10 11, Fig. 7, succeed each other in normal order in a drum-winding, on the contrary, it would be advantageous in order to simplify the elementary coil to invert the positions in depth of these two parts, as indicated in Fig. 8. This is, in fact, as if the inner portion 20 21 22 23 of the winding, Fig. 7, had been taken and arranged above the external portion 24 25 26 27, as shown in Fig. 8. The guide-curve of each coil, such as 9 12, is then constituted by two fourths of sinusoids joined at the summits. In these conditions the conductors of the same coil, half of which are positive, 9, Fig. 8, and half negative, 12, Fig. 8, make, as regards one half, (9,) the second portion of the sinusoid 8 9, Fig. 7, comprised between two successive poles, and for the other half, 12, Fig. 8, the first part of the sinusoid 12 13, Fig. 7, comprised in the following polar interval.

Figs. 9 and 10 represent by way of example a coil having six conductors the guide-curve of which is composed in this manner of two parts of a sinusoid joined at the summits. Fig. 9 is an end view, and Fig. 10 a plan view. This coil may be made, for example, by winding upon a caliber in the following manner: Starting from the extremity $o$, the length or conductor 4 is first of all formed, proceeding from behind forward. Then the wire rises, passing transversely from 4 3. It returns rearward to form 3, redescends behind 3 to 5, forms 5, rises in front of 5 to 2, forms 2, descends behind 2 to 6, forms 6, rises in front of 6 to 1, forms 1, and terminates at $p$. The two extremities $o$ and $p$ are connected to two successive contacts of the collector. Of course the coils may be made otherwise than upon a caliber—for example, in welded bars.

If the conductors are received in notches, it may be necessary to separate them a little from their mathematical position in order to bring them opposite the notches, so that the guide-curve may be slightly deformed. Nevertheless with a judicious choice of teeth this deviation is practically insignificant.

Fig. 11 shows by way of example that arrangement of coils similar to that of Figs. 9 and 10 upon the core of a four-pole armature provided with seventy-six teeth. The successive coils are designated by $a\ b\ c$ and their six conductors by $a'\ a^2\ a^3,\ b'\ b^2\ b^3$, and so on.

In order to show that the irregularity due to the mounting in the teeth or notches may be exceedingly small, upon Fig. 12 is shown the distribution of ampere-turns for the winding of Fig. 11.

In Fig. 12 there is represented at $x\ x$ the development of the foliated iron core and in its notches the section of the conductors. The conductors with cross-hatching are those of the neutral coil, short-circuited by the brush, and the others are marked with the plus or minus sign, according as they are traversed by a positive or a negative current. The curve $k$ gives the elementary ampere-turns in each notch. As these ampere-turns are proportionate to the algebraic sum of the positive and negative conductors of the notch, it is the same for the successive ordinates of the curve $k$. The curve $l$, which gives the totalized ampere-turns—that is to say, the magneto-motive force at each point—is the most important, because it shows that the error due to the winding in notches is very small. In fact, the crosses indicate a certain number of points of the strict sinusoid, and it is seen that the curve really obtained deviates very little from this sinusoid.

It is obvious from what has been stated that this method of winding is applicable to all electrical appliances and machines of constant power—that is to say, in all cases where at present the effects of the currents and of the fields are assimilated to a constant vector rotating with a uniform velocity. As examples may be cited application to the armatures of ordinary dynamos, to alternators, to polymorphic machines, (alternator-dynamo commutator,) to phase-transformers, to direct transformers of polyphase into continuous current.

What I claim, and desire to secure by Letters Patent of the United States, is—

1. A bobbin for the windings of electric machines, constituted by a certain number of conductors all arranged in series, which are distributed in such a manner that if they are assumed to be cut by a plane at right angles to the axis of the winding, the centers of all the sections of conductors are situated approximately upon a portion of sinusoid from summit to summit, the length of which is equal to the distance which separates two poles of the winding, while the projections of these sections upon a line perpendicular to the axis of the sinusoid are superposed without interruption or overlapping substantially as described and for the purpose specified.

2. A bobbin for the windings of electric machines constituted by a certain number of conductors all in series and forming groups distributed in such a manner that if they are assumed to be cut by a plane at right angles to the axis of the winding the centers of all the sections of the groups of conductors are situated approximately upon a portion of sinusoid from summit to summit the length of which is equal to the distance which separates two poles of the winding, while the projections of these sections upon a line perpendicular to the axis of the sinusoid are superposed without interruption or overlapping; substantially as described and for the purpose specified.

3. A bobbin for the windings of electric machines, constituted by a certain number of conductors all in series which are distributed in such a manner that, if they are assumed to be cut by a plane at right angles to the axis of the winding, the centers of all the sections of conductors are situated approximately upon a guide-curve constituted by dividing a portion of sinusoid from summit to summit the length of which is equal to the distance which separates two poles of the winding and in joining the various fractions in any order of superposition while the projections of these sections upon a line perpendicular to the longitudinal axis of the guide-curve are superposed without interruption or overlapping, substantially as described and for the purpose specified.

4. A bobbin for the windings of electric machines constituted by a certain number of conductors all in series and forming groups distributed in such a manner that, if they are assumed to be cut by a plane at right angles to the axis of the winding the centers of all the sections of the groups of conductors are situated approximately upon a guide-curve constituted by dividing a portion of sinusoid from summit to summit the length of which is equal to the distance which separates two poles of the winding and by joining the various fragments in any desired order of superposition, while the projections of these sections upon a line at right angles to the longitudinal axis of the guide-curve are superposed without interruption or overlapping substantially as described and for the purpose specified.

5. A winding for electric machines formed by bobbins which are all identical, imbricated with a constant displacement each of these bobbins being constituted by a certain number of conductors all in series which are distributed in such a manner that, if they are assumed to be cut by a plane perpendicular to the axis of the winding, the centers of all the sections of conductors are situated approximately upon a portion of sinusoid from summit to summit the length of which is equal to the distance which separates two poles of the winding, while the projections of these sections upon a line perpendicular to the axis of the sinusoid are superposed without interruption or overlapping substantially as described and for the purpose specified.

6. A winding for electric machines formed by bobbins all identical imbricated with a constant displacement, each of these bobbins being constituted by a certain number of conductors all in series and forming groups distributed in such a manner that, if they are assumed to be cut by a plane perpendicular to the axis of the winding, the centers of all the sections of the groups of conductors are situated approximately upon a portion of sinusoid from summit to summit the length of which is equal to the distance which separates two poles of the winding, while the projections of these sections upon a line perpendicular to the axis of the sinusoid are superposed without interruption or overlapping, substantially as described and for the purpose specified.

7. A winding for electric machines formed by bobbins all identical imbricated with a constant displacement each of these bobbins being constituted by a certain number of conductors all in series which are distributed in such a manner that, if they are assumed to be cut by a plane perpendicular to the axis of the winding the centers of all the sections of conductors are situated approximately upon a guide-curve constituted by dividing a portion of sinusoid from summit to summit, the length of which is equal to the distance which separates two poles of the winding and by joining the various fragments in any desired order of superposition, while the projections of these sections upon a line perpendicular to the longitudinal axis of the guide-curve are superposed without interruption or overlapping, substantially as described and for the purpose specified.

8. A winding for electric machines, formed by bobbins all identical imbricated with a constant displacement each of these bobbins being constituted by a certain number of conductors all in series and forming groups distributed in such a manner that, if they are assumed to be cut by a plane perpendicular to the axis of the winding, the centers of all the sections of the groups of conductors are situated approximately upon a guide-curve constituted by dividing a portion of sinusoid from summit to summit, the length of which is equal to the distance which separates two poles of the winding and by joining the various fragments in any desired order of superposition, while the projections of these sections upon a line perpendicular to the longitudinal axis of the guide-curve are superposed without interruption or overlapping, substantially as described and for the purpose specified.

In testimony whereof I have hereunto set my hand, in presence of two subscribing witnesses, this 29th day of September, 1902.

RAYMOND ROUGÉ.

Witnesses:
 HENRY AUGUSTE BERTIN,
 EDWARD P. MACLEAN.